United States Patent
Meshchaninov et al.

(10) Patent No.: US 11,828,460 B1
(45) Date of Patent: Nov. 28, 2023

(54) MOBILE CREMATORIUM

(71) Applicants: Mikhail Aleksandrovich Meshchaninov, Zhukovskiy (RU); Dmitrii Yanovich Agasarov, Krasnodar (RU); Anton Viktorovich Sergeev, Krasnodar (RU)

(72) Inventors: Mikhail Aleksandrovich Meshchaninov, Zhukovskiy (RU); Dmitrii Yanovich Agasarov, Krasnodar (RU)

(73) Assignees: Mikhail Aleksandrovich Meshchaninov, Zhukovskiy (RU); Dmitrii Yanovich Agasarov, Krasnodar (RU); Anton Viktorovich Sergeev, Krasnodar (RU)

( * ) Notice: Subject to any disclaimer, the term of this patent is extended or adjusted under 35 U.S.C. 154(b) by 0 days.

(21) Appl. No.: 18/221,453

(22) Filed: Jul. 13, 2023

Related U.S. Application Data

(63) Continuation of application No. PCT/IB2022/060872, filed on Nov. 11, 2022.

(30) Foreign Application Priority Data

Dec. 30, 2021 (RU) .......................... RU2021140063

(51) Int. Cl.
*F23G 5/40* (2006.01)
*F23G 5/08* (2006.01)

(52) U.S. Cl.
CPC ............... *F23G 5/40* (2013.01); *F23G 5/085* (2013.01)

(58) Field of Classification Search
None
See application file for complete search history.

(56) References Cited

U.S. PATENT DOCUMENTS

| | | |
|---|---|---|
| 2005/0021102 A1 | 1/2005 | Ignagni et al. |
| 2008/0208280 A1 | 8/2008 | Lindenthaler et al. |
| (Continued) | | |

FOREIGN PATENT DOCUMENTS

| | | |
|---|---|---|
| CN | 1316615 A | 10/2001 |
| CN | 103204467 A | 7/2013 |
| (Continued) | | |

OTHER PUBLICATIONS

Search report in PCT/IB2022/060911, dated Feb. 28, 2023.
(Continued)

*Primary Examiner* — Jason Lau
(74) *Attorney, Agent, or Firm* — Bardmesser Law Group

(57) ABSTRACT

The invention relates to cremation of dead bodies of humans or animals by plasma-chemical destruction method. A mobile crematorium includes a chassis bearing a reactor implemented as a closed cavity with an opening for placing dead bodies of humans or animals to be cremated into the reactor, and to close the reactor after that, and also with an opening for outputting gaseous products. The crematorium additionally includes a source of high-voltage pulses, that is connected to an electrode protruding into the reactor via an isolating member, wherein inner surfaces of the reactor cavity are made conductive entirely or partially and a gap is provided between the inner surfaces and the electrode, the gap assuring generation of corona discharge plasma in the reactor due to the high-voltage pulses.

7 Claims, 1 Drawing Sheet

(56) References Cited

U.S. PATENT DOCUMENTS

| | | | |
|---|---|---|---|
| 2009/0056604 A1* | 3/2009 | Hartvigsen | F23G 7/003 |
| | | | 110/346 |
| 2013/0318947 A1 | 12/2013 | Malik et al. | |
| 2014/0142652 A1 | 5/2014 | Francois et al. | |
| 2016/0067485 A1 | 3/2016 | Lindenthaler et al. | |
| 2020/0164207 A1 | 5/2020 | Meyyappan et al. | |
| 2021/0104906 A1 | 4/2021 | Wang et al. | |

FOREIGN PATENT DOCUMENTS

| | | | |
|---|---|---|---|
| CN | 103368447 | A | 10/2013 |
| CN | 205288095 | U | 6/2016 |
| CN | 110995050 | A | 4/2020 |
| EA | 012275 | B1 | 8/2009 |
| ES | 2909949 | A1 | 5/2022 |
| FR | 1237539 | A | 7/1960 |
| GB | 516158 | A | 12/1939 |
| JP | H08299747 | A | 11/1996 |
| KR | 20080050318 | A | 6/2022 |
| KZ | 24850 | A4 | 11/2011 |
| RU | 2116244 | C1 | 7/1998 |
| RU | 2122519 | C1 | 11/1998 |
| RU | 12220 | U1 | 12/1999 |
| RU | 61705 | U1 | 3/2007 |
| RU | 2326487 | C2 | 6/2008 |
| RU | 2410835 | C1 | 1/2011 |
| RU | 122466 | U1 | 11/2012 |
| RU | 2592085 | C1 | 7/2016 |
| RU | 2741004 | C1 | 1/2021 |
| RU | 2753275 | C1 | 8/2021 |
| UZ | 5108 | B | 4/2002 |
| UZ | 4426 | C | 10/2011 |
| WO | 2012/044875 | A1 | 5/2012 |

OTHER PUBLICATIONS

Ecotechnics, Equipment for cleaning processes for industrial gases and liquids: A study guide / D.E. Smirnov (et al.); gen. ed. by L.V. Chekalov, A.V. Sugak.—Yaroslavl: YaGTU publ., 2013.—180 pages. ISBN 978-5-9914-0351-1.

Aristova N.A., Piskarev I.M., Ivanovskiy A.V., Selemir V.D., Spirov G.M., Shlepkin S.I., Initiation of chemical reactions by electrical discharge in dielectric-gas-liquid configuration // Physical Chemistry Journal, 2004, vol. 78, #7, pp. 1326-1331.

Piskarev I.M., Oxidation-reduction processes in water initiated by electrical discharge above water surface // General Chemistry Journal, 2001, vol. 71, Issue 10, p. 1622.

Search report in PCT/IB2022/058934, dated Dec. 15, 2022.

Search report in PCT/IB2022/058935, dated Dec. 22, 2022.

Search report in PCT/IB2022/058937, dated Dec. 15, 2022.

Search report in PCT/IB2022/060872, dated Mar. 2, 2023.

Search report in PCT/IB2022/060909, dated Mar. 2, 2023.

Rybka D. V. et al., Koronnyi razryad v vozdukhe atmosfernogo davleniya pri modul'nnom impul'se napryazheniya dlitel'nosti 10 ms (Coronal discharge in air of atmospheric pressure with modular voltage impulse of duration 10 ms), Optika atmosfery i okeana (Optics of atmosphere and ocean), 26, No. 1, 2013.

* cited by examiner

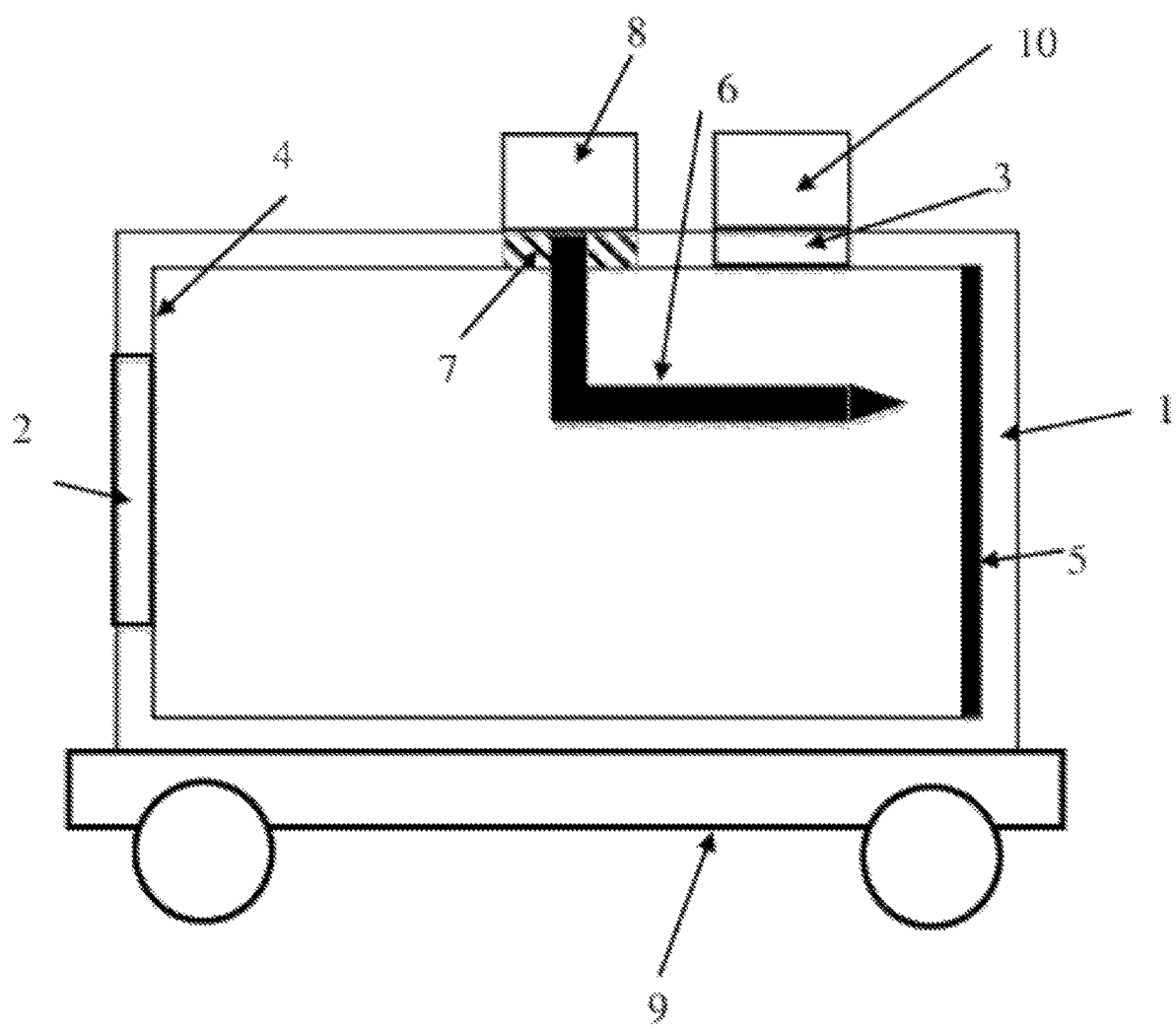

MOBILE CREMATORIUM

FIELD OF INVENTION

The invention relates to devices intended for cremation of dead bodies of humans or animals, in particular, for cremation by plasma-chemical destruction method.

PRIOR ART

There is a known movable crematorium of utility model patent RU122466 (published on Nov. 27, 2012). The crematorium consists of a shell disposed on a chassis, the shell including a burning chamber with a heat-resistant insert, a control unit configured to implement thermal and temporal pattern of burning chamber operations, and to control function of removal of combustion products, gas burners connected to a pipeline for feeding fuel mixture to the burner, and an exhaust pipe branch located on the butt end surface of the chamber and intended for removal of the combustion products.

A drawback of this device is necessity of using fuel for cremation and maintaining high temperature in the chamber to assure operations of the device, which may be not acceptable for movable mode of use.

As far as is known, cremation is burning of dead bodies in special furnaces. According to information of Physical Encyclopedia (Soviet Encyclopedia, Moscow, 1984):

"Burning is a complex chemical reaction that takes place under conditions of progressive self-acceleration related to accumulation of heat or catalyzing products of reaction in the system.

During burning, high temperature (up to several thousand degrees Kelvin) may be reached, and a light emitting area as known as flame often occurs. For instance, burning includes different exothermic reactions of high-temperature oxidation of fuel, decomposition of explosives, ozone, acetylene, additive reactions between some substances and chlorine, fluorine, etc. In most cases, burning consists of a number of elementary chemical processes and closely relates to heat transfer and mass transfer phenomena. Distinctive feature of burning is conducting chemical reaction under conditions of its self-acceleration. There are two self-acceleration mechanisms, thermal mechanism and chain mechanism. For thermal-type of burning, rate of chemical reaction increases sharply with rise of temperature, and heat generated during the reaction causes its further acceleration. For chain-type of burning, self-acceleration occurs owing to avalanche-like rise of concentration of active particles (atoms or radicals) during a branching chain reaction, which boosts chemical transformations".

According to document [1], plasma of discharge having atmospheric pressure exerts an effect on water, thus causing formation of free radicals due to disintegration of water molecules $H_2O \rightarrow OH\cdot + H\cdot$. The formed active radicals $OH\cdot$ initiate chain reaction of oxidation of organic substances, which occurs in presence of water, according to document [2]. In other words, this process may be attributed to burning processes and may be used for cremation.

SUMMARY OF INVENTION

The invention is directed to attaining a technical effect of broadening range of technical solutions by providing a movable crematorium that assures plasma-chemical destruction of dead bodies of humans or animals.

This technical effect is attained by a movable crematorium that includes a chassis bearing a reactor implemented in form of a housing with a closed cavity with an opening configured to provide placing dead bodies of humans or animals to be cremated in the reactor, and to close the reactor after that, and also with an opening for outputting gaseous products, wherein the crematorium includes a source of high-voltage pulses, that is connected to an electrode protruding into the reactor cavity via an isolating member, and wherein inner surfaces of the reactor cavity are made conductive entirely or partially and a gap is provided between the inner surfaces and the electrode, the gap assuring generation of corona discharge plasma in the reactor due to the high-voltage pulses.

Preferably, minimum size of the gap between the electrode and conductive portions of the cavity inner surfaces is 5 to 50 millimeters. Preferably, the conductive portions of the cavity inner surfaces are made of steel and grounded. Preferably, the electrode is made of steel.

Preferably, pressure inside the reactor is decreased by 0.1 to 1.0 Pa compared to atmospheric pressure. In one embodiment, decrease in pressure inside the reactor is provided by electrostatic filter having an extraction air fan, which filter is connected to the opening for outputting gaseous products. Preferably, input of outside air to the reactor is restricted.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 shows a vertical cross-section of the reactor.

DETAILED DESCRIPTION OF EMBODIMENTS OF THE INVENTION

Reference will now be made in detail to the preferred embodiments of the present invention, examples of which are illustrated in the accompanying drawings.

FIG. 1 shows a vertical cross-section of the reactor, where the following designators are used:

1—reactor with inner cavity;
2—input opening;
3—output opening;
4—inner surface of reactor cavity;
5—conductive portions of inner surface of reactor cavity;
6—electrode;
7—isolating member;
8—source of high-voltage pulses;
9—chassis;
10—electrostatic filter with extraction air fan.

The invention may be implemented as a movable crematorium that includes a chassis (9) bearing a reactor (1) with an input opening (2) configured to close the reactor after a dead body to be cremated is placed inside, and with an output opening (3) connected to an electrostatic filter (10) equipped with an extraction air fan, wherein a portion (5) of the inner surface (4) of the reactor cavity is made of steel, an electrode (6) protrudes into the reactor cavity via an isolating member (7), and the electrode (6) is connected a source (8) of high-voltage pulses, while the electrode (6) is spaced from the portion (5) of the inner surface (4) of the reactor cavity by a gap of 20 millimeters.

The movable crematorium operates as follows.

The movable crematorium installed on the chassis (9) is transported to a place of conducting cremation. The portion (5) of the inner surface (4) of the cavity of the reactor (1) is grounded. Dead bodies of humans or animals to be cremated are placed in the crematorium via the input opening (2) and then the input opening (2) is closed. High-voltage pulses are supplied to the electrode (6) from the source (8). As it is known from document [1], large number of streamers occur between the electrode (6) and the grounded conductive portion (5) of the inner surface (4) of the reactor cavity with each pulse. The streamers start multiplying and spreading towards the portion (5), gradually populating the inter-electrode gap and forming corona discharge. Plasma of corona discharge exerts an effect on water contained in the dead bodies to be cremated and causes formation of free radicals upon destruction of water molecules: $H_2O \rightarrow OH\cdot + H\cdot$. In addition, other active substances are formed in the reactor under action of corona discharge: $O_3$, $O_2(a^1\Delta)$, $H_2O_2$, $OH$, $O(^3P)$, $NO$, $HNO_2$ and $HNO_3$. Corona discharge also causes ultraviolet (UV) radiation. The above-mentioned active substances and UV radiation destroy any organic and inorganic substances contained in the dead bodies to be cremated, thus providing complete destruction thereof and formation of harmless gaseous reaction products, namely, water and carbon dioxide. Non-organic contents of the dead bodies to be cremated are destroyed by acids. Process of oxidation of organic substances is a chain reaction [2]. The destruction chain reaction is initiated by $OH\cdot$ radicals. In other words, plasma-chemical destruction of both organic and inorganic substances contained in the dead bodies to be cremated is provided in the device. Gaseous products of destruction enter the output opening.

Thus, the specified technical effect is attained in the device by providing a movable crematorium that ensures plasma-chemical destruction of dead bodies of humans or animals.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

Non-patent Literature

[1] Aristova N. A., Piskarev I. M., Ivanovskiy A. V., Selemir V. D., Spirov G. M., Shlepkin S. I., Initiation of chemical reactions by electrical discharge in dielectric-gas-liquid configuration//Physical Chemistry Journal, 2004, Vol. 78, #7, pages 1326-1331.

[2] Piskarev I. M., Oxidation-reduction processes in water initiated by electrical discharge above water surface// General Chemistry Journal, 2001, Vol. 71, Issue 10, page 1622.

What is claimed is:

1. A mobile crematorium, comprising:
   a wheeled chassis;
   a reactor mounted on the wheeled chassis;
   the reactor including a housing with a closed cavity that has an opening configured for placing dead bodies of humans or animals to be cremated in the reactor,
   the opening configured to be closed after the placing;
   the reactor including a second opening for outputting gaseous products of cremation;
   an electrode protruding into the reactor cavity via an isolating member, wherein inner surfaces of the reactor cavity are made conductive entirely or partially, and a gap between the inner surfaces and the electrode, the gap assuring generation of corona discharge plasma in the reactor due to high-voltage pulses; and
   a source of the high-voltage pulses connected to the electrode.

2. The mobile crematorium of claim 1, wherein the gap between the electrode and conductive portions of the inner surfaces of the reactor cavity is 5 to 50 millimeters.

3. The mobile crematorium of claim 1, wherein the electrode is made of steel.

4. The mobile crematorium of claim 1, wherein conductive portions of the inner surfaces of the reactor cavity are made of steel and are grounded.

5. The mobile crematorium of claim 1, wherein pressure inside the reactor is 0.1 to 1.0 Pa less than atmospheric pressure.

6. The mobile crematorium of claim 5, wherein a decrease in pressure inside the reactor is provided by a connection of an electrostatic filter to the second opening, and wherein the electrostatic filter has an extraction air fan.

7. The mobile crematorium of claim 1, wherein input of outside air to the reactor is restricted.

* * * * *